United States Patent [19]
Bozoian

[11] 3,938,117
[45] Feb. 10, 1976

[54] CRITICAL LIQUID-LEVEL WARNING CIRCUIT

[75] Inventor: Michael Bozoian, Ann Arbor, Mich.

[73] Assignee: Ford Motor Company, Dearborn, Mich.

[22] Filed: Sept. 20, 1974

[21] Appl. No.: 508,018

[52] U.S. Cl. .............................. 340/244 R; 340/59
[51] Int. Cl.² ........................................ G08B 21/00
[58] Field of Search ......... 340/244, 59; 73/308, 313

[56] References Cited
UNITED STATES PATENTS

| | | | |
|---|---|---|---|
| 3,333,469 | 8/1967 | Godfrey | 340/244 B |
| 3,534,352 | 10/1970 | Gallagher | 340/59 X |

*Primary Examiner*—John W. Caldwell
*Assistant Examiner*—Daniel Myer
*Attorney, Agent, or Firm*—Robert W. Brown; Keith L. Zerschling

[57] ABSTRACT

A critical liquid-level warning circuit for association with a liquid-level indicating circuit, the indicating circuit including a sensing device that provides a voltage which varies between upper and lower voltage limits as a function of the level of a liquid. The warning circuit is particularly suitable for use in indicating a low fuel level in the fuel tank of a vehicle and, in the preferred embodiment, includes a first operational amplifier responsive to the sensing device voltage and a second operational amplifier that controls the actuation of a warning device. A delay circuit is interposed between the first and second operational amplifiers. The output of the first operational amplifier changes from one condition to another condition upon occurrence of a critical liquid level. The delay circuit provides a voltage which varies in magnitude as a function of time elapsed subsequent to the change in condition of the output of the first operational amplifier. This variable voltage controls the second operational amplifier. Preferably, the second operational amplifier circuit includes means for delaying the de-actuation of the warning device, thereby, to prevent intermittent warning device operation.

11 Claims, 1 Drawing Figure

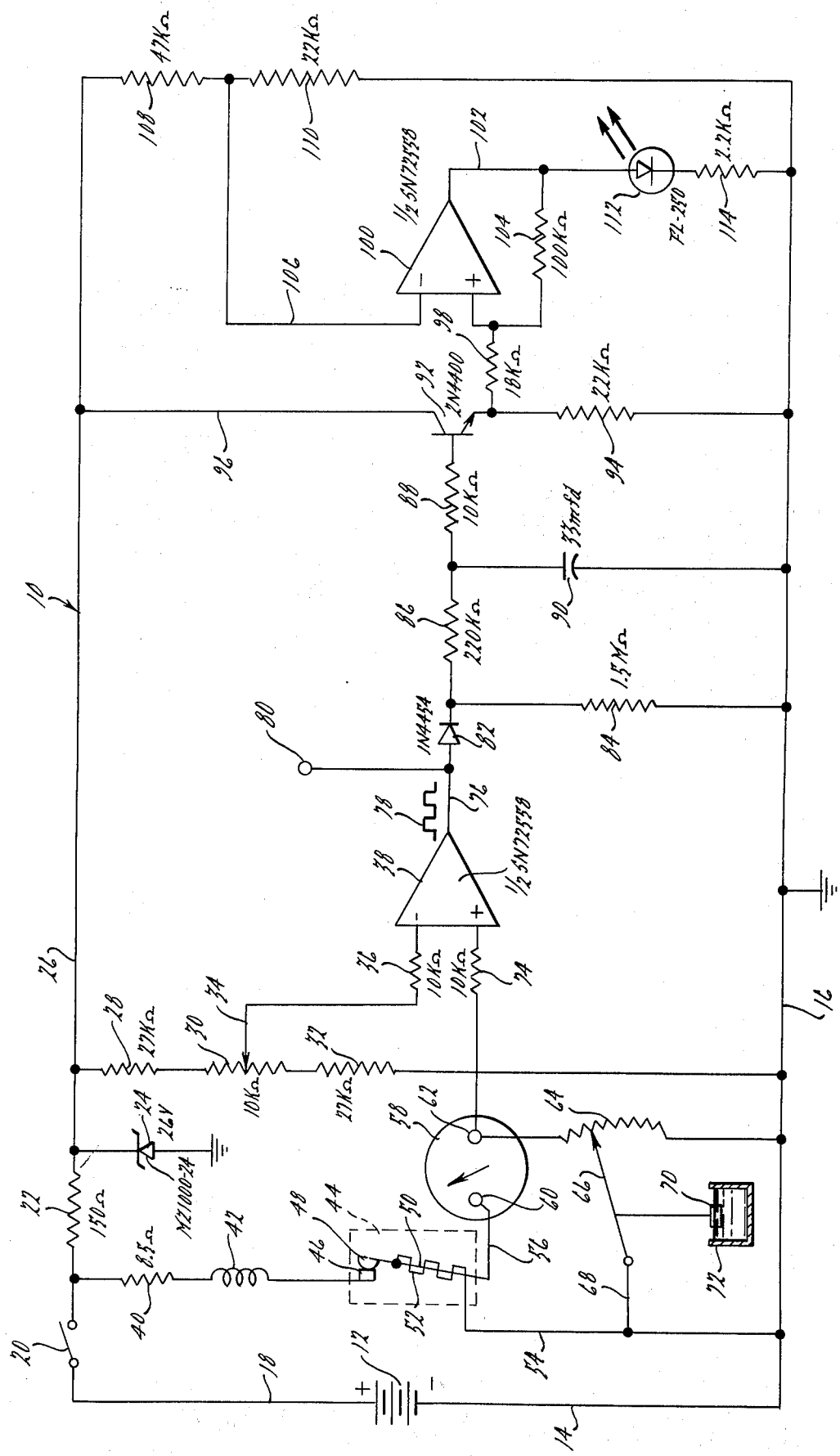

CRITICAL LIQUID-LEVEL WARNING CIRCUIT

BACKGROUND OF THE INVENTION

This invention relates to a critical liquidlevel warning circuit particularly suitable for use in a motor vehicle to indicate a low or critical level in its fuel tank. More particularly, the invention relates to a warning circuit for association with a liquid-level indicating circuit for a motor vehicle. The indicating circuit provides a voltage signal which varies between upper and lower voltage limits as a function of the liquid level sensed by a sensing device.

Related prior art includes the following U.S. Pat. Nos: 3,668,630; 3,681,753; 3,739,337; 3,740,740; 3,644,885; 3,641,544; and 3,623,043. The first four of these patents are believed to be the most pertinent.

It is an object of the invention to provide a critical liquid-level warning circuit suitable for use in a motor vehicle to provide its operator with a visual or other warning indication when the quantity of fuel remaining in the vehicle fuel tank is at a low or critical level, for example, one-eighth of full tank capacity. In the preferred form of the invention, as hereinafter described, the critical liquid-level warning circuit is capable of being packaged on the rear portion of a conventional fuel indicating gauge. This permits associative calibration of both the indicating gauge and the critical liquid-level indicating circuit. Also, the warning circuit of the invention is capable of providing a time delay of 20 or more seconds between the occurrence of a critical liquid-level and the provision of the warning signal to the vehicle operator. This time delay is desirable to prevent the occurrence of false low-fuel warnings that might otherwise occur when the vehicle is accelerating, going uphill or downhill, cornering, or undergoing operation that causes the fuel to slosh about or otherwise vary in level in a transient manner. The circuit of the invention also is capable of providing a time delay with respect to de-actuation of the warning device once it has been actuated.

The critical liquid-level warning circuit of the invention is capable of operating over an extended ambient temperature range and is provided with protection against vehicle electrical transient conditions. An important feature of the invention is that the critical liquid-level warning circuit may be calibrated during its manufacture without it being necessary to await the elapse of the time delay provided in the warning circuit. Furthermore, the warning circuit is of a design that permits integrated circuit construction, a feature highly desirable in a circuit to be produced in large volume. Also, the circuit of the invention is compatible with both magnetic gauge fuel indicating systems and thermal milliammeter gauge systems.

The invention may be better understood by reference to the detailed description which follows and to the drawing, which is a schematic electrical diagram of a liquid-level indicating circuit and of a critical liquid-level warning circuit particularly suitable for use as a vehicle low-fuel warning circuit.

DETAILED DESCRIPTION

With reference now to the drawing, there is shown a circuit generally designated by the numeral 10 which includes a critical liquid-level warning circuit. The circuit 10 also includes a gauge indicating circuit that provides a voltage signal which varies between upper and lower voltage limits as a function of a liquid level sensed by a sensing device. In the preferred form of the invention depicted by the circuit 10, the liquid level sensed is the level of fuel in the tank of a motor vehicle and the critical liquid-level warning is provided to indicate a low fuel level. In the drawing, the various component values and component types are given for the purpose of example and not limitation.

The circuit 10 includes a DC source of electrical energy, which may be a conventional vehicle twelve-volt storage battery 12, having its negative terminal lead 14 connected to ground at 16. The positive terminal lead 18 from the DC source is connected through a conventional vehicle ignition switch 20 to one terminal of a resistor 22. A positive voltage supply lead 26 is connected to the other terminal of the resistor 22. The cathode of a zener diode 24 is connected to this supply lead 26 and its anode is connected to ground. The zener diode 24 provides transient protection for the circuit 10. The resistor 22 limits the current.

A voltage divider is formed from the series connection, between the voltage supply leads 26 and 16, of a resistor 28, a potentiometer 30 and a resistor 32. The arm 34 of the potentiometer 30 is connected through an input resistor 36 to the negative input of an operational amplifier 38 used as a comparator. The voltage on the potentiometer arm 34 provides a reference potential that establishes the liquid level at which the critical liquid-level warning circuit provides the vehicle operator with a low fuel warning signal.

A current limiting resistor 40 has its upper terminal connected to the junction formed between the ignition switch 20 and the resistor 22 and has its lower terminal connected through a radio frequency choke 42 to a thermal voltage regulator 44. The voltage regulator 44 has a fixed contact 46 and a movable contact 48 on a movable arm 50. A coil of resistance wire 52 is wound about the movable arm 50 and is connected by a lead 54 to the ground lead 16. With the ignition switch 20 closed and the contacts 46 and 48 closed, current flows through the resistor 40, the choke 42, the contacts 46 and 48, the resistance wire 52 and the lead 54. This causes the resistance wire 52 to dissipate heat which is transferred to the movable arm 50. The movable arm 50 is made from a bimetallic material and, as a result, the heat causes the movable arm 50 to deform opening the contacts 46 and 48. This interrupts the current flow through the resistance wire 52, the bimetallic arm 50 cools, and the contacts 46 and 48 again close. The repeated opening and closing of the contacts 46 and 48 produces a voltage on a lead 56 connected to the movable arm 50 that has a rectangular pulse waveform and that has a duty cycle that depends upon the magnitude of the voltage produced by the DC source 12. Higher voltages from the DC source reduce the duty cycle because the resistance wire 52 dissipates energy at a greater rate. Lower supply line voltages increase the duty cycle of the rectangular voltage waveform on the lead 56. Also, it should be noted that higher supply line voltages tend to increase the voltage on the potentiometer arm 34 and lower supply line voltages tend to decrease its voltage.

Lead 56 from the voltage regulator is connected to a terminal 60 of a fuel gauge 58. The fuel gauge 58 may be a thermo-milliammeter gauge, a magnetic gauge or the like. Its terminal 62 is connected through the resistance of a rheostat 64 to the ground lead 16. The rheostat 64 has a movable arm 66 that is connected by a lead 68 to the grounded lead 54. The arm 66 of the potentiometer is connected to a float mechanism 70 located in the fuel tank 72 of a motor vehicle. When the fuel tank 72 is full, the arm 66 is at an upper position, as viewed in the drawing, so that the resistance between the fuel gauge terminal 62 and the ground lead 16 is at a minimum resulting from the fact that the arm 66 and the lead 68 short circuit or shunt the lower resistance portion of the rheostat 64. When the fuel tank reaches an empty position, the arm 66 is at a lower position and a maximum resistance is interposed between the gauge terminal 62 and the arm 66. Therefore, when the fuel tank is full, the maximum current flows through the gauge 58 and, when it is empty, the minimum current flows through this gauge. The voltage at the terminal 62 of the gauge is at its lowest level with respect to ground potential when the fuel tank is full and is at its highest level when the fuel tank is empty. Thus, the gauge and its associated circuitry provide a voltage signal at the terminal 62 that varies between lower and upper limits as a function of the fuel level sensed by the rheostat 64 and its associated float mechanism 70. At some predetermined point, corresponding to perhaps one-eighth of a full tank fuel level, it is desirable to provide the vehicle operator with an indication of this condition.

Terminal 62 of the gauge 68 is connected through an input resistor 76 to the positive input of the amplifier 38. When the voltage on the terminal 62 is lower than the voltage on the potentiometer arm 34, the output of the amplifier 38 is a minimum or low level voltage signal substantially equal to ground potential. However, when the voltage on the terminal 62 exceeds, by about 20 to 30 millivolts, the critical voltage level established by the setting of the potentiometer arm 34, then the positive input to the amplifier 38 is more positive than its negative input and the output of the amplifier 38 reaches its high saturated voltage level. However, the voltage on the output lead 76 of the amplifier 38 is a rectangular voltage waveform, as indicated at 78, when the critical level is exceeded because the voltage regulator 44 provides a rectangular voltage signal on the terminal 62 connected to the amplifier positive input.

It is contemplated that the potentiometer arm 34 would be set or calibrated during manufacture of the circuit 10. Preferably, the gauge 58 and the other components of the circuit 10 are assembled as a unit during the manufacturing process so that the critical liquid-level warning circuit may be calibrated at the same time that the gauge 58 is calibrated. In this connection, it should be noted that the signal on the output lead 76 occurs immediately after the voltage on the terminal 62 exceeds the critical predetermined low-fuel level established by the position of the potentiometer arm 34. Thus, during manufacturing calibration, the arm 66 of the rheostat 64 may be moved to a position corresponding to that at which it is desired to provide a low-fuel warning indication, and the potentiometer arm 34 may be adjusted until the rectangular waveform signal 78 appears on the output 76 of the amplifier 38. Immediate detection of this signal may be sensed at the calibration terminal 80 connected to the output 76.

The amplifier output lead 76 is connected to the anode of a blocking diode 82. The cathode of the diode 82 is connected through a resistor 84 to the ground lead 16 and is connected through a resistor 86 and a resistor 88 to the base of a transistor 92. The transistor 92 is connected as an emitter follower; it has its emitter connected through a current limiting resistor 94 to the ground lead 16 and has its collector connected by a lead 96 to the voltage supply lead 26. A capacitor 90, preferably a low leakage tantalum capacitor, has one of its terminals connected to the junction formed between the resistors 86 and 88 and has its other terminal connected to the ground lead 16.

The function of the circuitry described in the preceding paragraph is to provide a time delay between the occurrence of the rectangular waveform 78 at the output 76 of the amplifier 38 and the occurrence of the low fuel warning provided the vehicle operator. Preferably, this time delay is between 20 and 30 seconds and is necessary to prevent false low-fuel warnings which might otherwise occur during vehicle acceleration and deceleration, travel over bumpy roads or the like, and during cornering or uphill or downhill manuevers. These vehicle operating conditions cause transient changes in the level of the fuel sensed by the float mechanism 70. The time delay prevents such transient fuel level conditions from producing a low-fuel warning signal.

In the operation of the time delay circuitry, the appearance of the rectangular waveform 78 on the amplifier output lead 76 causes the capacitor 90 to be charged in a pulsating manner through the current path including the blocking diode 82 and the resistor 86. When the pulsating output waveform 78 is at its low voltage level, the blocking diode 82 is reverse-biased and therefore prevents discharge of the capacitor 90 through the amplifier 38 circuitry. However, the capacitor 90 can discharge to some extend through the current path including the resistor 86 and the high resistance 84. Thus, subsequent to the occurrence of the low fuel condition signified by the appearance of the rectangular waveform 78 at the output 76 of the amplifier 38, the capacitor 90 gradually charges and has an increasing voltage level at its upper terminal. This voltage is applied through the resistor 88 to the base of the transistor 92 to cause its emitter to attain a voltage level equal to the voltage on the upper terminal of the capacitor 90 less the small voltage drop across the resistor 88 and the base-emitter junction of the transistor 92. The voltage on the emitter of the transistor 92 is applied through an input resistor 98 to the positive input of an operational amplifier 100. The output lead 102 of the operational amplifier 100, is connected through a feedback resistor 104 to its positive input. The negative input 106 to the amplifier 100 is connected to the junction formed between resistors 108 and 110. Resistors 108 and 110 are connected in series between the positive voltage supply lead 26 and the ground supply lead 16. Thus, these resistors form a voltage divider and a reference voltage proportional to the voltage across the supply leads 26 and 16 is applied to the negative input lead 106 of the amplifier 100. When the voltage on the emitter of the transistor 92 is sufficiently high such that the voltage at the positive input to the amplifier 100 exceeds, by about 20 to 30 millivolts, the voltage on the negative input lead 106, then the voltage on the output lead 102 of the amplifier 100 increases to its maximum positive level with respect to ground potential. This voltage is fed back through the feedback resistor 104 to the positive input to the amplifier 100, thereby, to provide hysteresis in the amplifier 100 circuitry and to reduce its response time. The hysteresis effect produced by the feedback resistor 104 requires that the emitter of the transistor 92 achieve a substantially lower voltage level, in order to change the amplifier 100 output from a high voltage level to a low voltage level, than is required initially to change the amplifier 100 output from a low voltage level to a high voltage level.

The output lead 102 from the amplifier 100 is connected to the anode of a light emitting diode 112, which is a Fairchild Semiconductor Corporation type FL-250. The cathode of the light emitting diode 112 is connected through a current limiting resistor 114 to the ground lead 16. When the voltage on the output lead 102 of the amplifier 100 is at its high voltage level, the light emitting diode is conductive and emits light which, due to the location of the light emitting diode 112 in the vehicle instrument panel or other suitable location, provides the vehicle operator with a warning of a low fuel condition. Of course, a warning device other than a light emitting diode may be utilized; for example, the diode 112 and the resistor 114 may be replaced by a relay coil having contacts positioned to control a warning device such as an incandescent bulb or buzzer.

The operational amplifiers 38 and 100 as shown in the drawing bear type numbers indicating that each is one half of a very inexpensive operational amplifier integrated circuit manufactured by Texas Instruments, Inc. These inexpensive operational amplifiers have low input impedences and, therefore, the emitter follower transistor 92 is provided to provide a high impedance buffer between the capacitor 90 of the time delay circuit and the input to the amplifier 100. The emitter follower 92 also provides the low signal source impedence desirable for the input to the amplifier 100.

The resistors 90 and 104 as shown have resistance values designed to provide a time delay, subsequent to the occurrence of a voltage on the gauge terminal 62 below the critical level established by the potentiometer arm 34, for de-energization of the warning device 112. This time delay for de-energization of the warning device is comparable to the time delay required to energize it subsequent to the occurrence on the gauge terminal 62 of a voltage above the predetermined critical level established by the setting of the potentiometer arm 34. In other words, symmetrical time delays for actuation and de-actuation of the warning device 112 may be provided.

Based upon the foregoing description of the invention, what is claimed is:

1. A critical liquid-level warning circuit for association with a liquid-level indicating circuit, said indicating circuit including a sensing device which provides a voltage that varies between lower and upper voltage limits as a function of a liquid level sensed by said sensing device, said critical liquid-level warning circuit comprising:
    first circuit means, supplied with said sensing device voltage, for generating an electrical signal having one of two conditions depending upon whether said sensing device voltage is below or above a predetermined critical level;
    an electrically actuable warning device;
    second circuit means for controlling the actuation of said warning device, said second circuit means having an output coupled to said warning device and having an input responsive to a predetermined voltage level to cause said output to actuate said warning device; and
    a delay circuit, coupled to the output of said first circuit means and to the input of said second circuit means, said delay circuit producing a voltage signal which varies in magnitude as a function of time elapsed subsequent to the change of said electrical signal generated by said first circuit means from one of said two conditions to the other of said two conditions, said second circuit means actuating said warning device when said variable voltage signal reaches a predetermined level.

2. A critical liquid-level warning circuit as recited in claim 1 wherein said second circuit means further includes circuit means for delaying the de-actuation of said warning device.

3. A critical liquid-level warning circuit as recited in claim 2, wherein said delay circuit includes a transistor connected as an emitter follower, said delay circuit being coupled to said second circuit means through said transistor.

4. A critical liquid-level warning circuit as recited in claim 1, wherein said delay circuit includes a capacitor and a resistor, said capacitor being charged through said resistor when said electrical signal generated by said first circuit means changes from said one of said two conditions to said other of said two conditions.

5. A critical liquid-level warning circuit as recited in claim 3, wherein said delay circuit includes a transistor connected as an emitter follower, said delay circuit being coupled to said second circuit means through said transistor.

6. A critical liquid-level warning circuit as recited in claim 1, wherein said delay circuit includes a transistor connected as an emitter follower, said delay circuit being coupled to said second circuit means through said transistor.

7. A critical liquid-level warning circuit as recited in claim 1, wherein said second circuit means includes means for delaying the de-actuation of said warning device subsequent to a change of said electrical signal generated by said first circuit means from said other of said two conditions to said one of said two conditions.

8. A critical liquid-level warning circuit for association with a liquid-level indicating circuit, said indicating circuit including a sensing device which provides a voltage that varies between lower and upper voltage limits as a function of a liquid level sensed by said sensing device, said critical liquid-level warning circuit comprising:
    first circuit means for generating a first reference voltage signal;
    an amplifier having a first input coupled to said first circuit means to couple said first reference voltage signal to said first input of said first amplifier, said amplifier having a second input adapted to be supplied with said sensing device voltage, said first amplifier having an output voltage which changes from a first condition to a second condition when the polarity of said sensing device voltage, with respect to said first reference voltage signal, changes;
    a time delay circuit including a resistor and a capacitor, said capacitor being charged through said resistor when the output of said first amplifier changes from said first condition to said second condition;
    means for generating a second reference voltage signal;

a second amplifier having a first input to be supplied with said second reference voltage signal and having a second input coupled to said time delay circuit, said second amplifier having an output which changes from a first condition to a second condition when the voltage across said capacitor in said time delay circuit reaches a predetermined level; and a warning device, said warning device being actuated when said second amplifier output changes from its first condition to its second condition.

9. A critical liquid-level warning circuit as recited in claim 8, wherein said time delay circuit further includes a transistor connected as an emitter follower, the emitter of said transistor being coupled to said second input of said second amplifier and the base of said transistor being coupled to said capacitor.

10. A critical liquid-level warning circuit as recited in claim 9, which further includes a feedback resistor coupled between said output of said second amplifier and said second input of said second amplifier.

11. A critical liquid-level warning circuit as recited in claim 10, wherein said first circuit means for generating said first reference signal comprises a voltage divider, wherein said second circuit means for generating said second reference voltage signal comprises a voltage divider and wherein said liquid-level indicating circuit includes a voltage regulator that causes said sensing device voltage to pulsate, said first amplifier when in its second condition having an output voltage signal which pulsates in a manner corresponding to the pulsations of said voltage regulator.

* * * * *